United States Patent
Schmidt et al.

(10) Patent No.: US 11,648,952 B2
(45) Date of Patent: May 16, 2023

(54) METHODS AND SYSTEMS FOR CONTROLLING MOTOR VEHICLE FUNCTIONS FOR CONTROLLING MOTION SICKNESS

(71) Applicant: Ford Global Technologies, LLC, Dearborn, MI (US)

(72) Inventors: Eike Schmidt, Cologne (DE); Stefan Wolter, Wurselen (DE); Florian Golm, Herzogenrath (DE); Pim van der Jagt, Selfkant (DE)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 17/160,245

(22) Filed: Jan. 27, 2021

(65) Prior Publication Data
US 2021/0237747 A1    Aug. 5, 2021

(30) Foreign Application Priority Data

Jan. 31, 2020 (DE) ........................ 102020201218.0

(51) Int. Cl.
*B60W 50/00* (2006.01)
*B60W 40/08* (2012.01)
*B60W 60/00* (2020.01)

(52) U.S. Cl.
CPC ........ *B60W 50/0098* (2013.01); *B60W 40/08* (2013.01); *B60W 50/0097* (2013.01); *B60W 60/0013* (2020.02); *B60W 2540/221* (2020.02)

(58) Field of Classification Search
CPC ............. B60W 50/0098; B60W 40/08; B60W 50/0097; B60W 60/0013; B60W 2540/221; B60W 50/14; B60R 16/037; A61B 5/4005
See application file for complete search history.

(56) References Cited

U.S. PATENT DOCUMENTS

| | | | |
|---|---|---|---|
| 2018/0052000 A1* | 2/2018 | Larner | G01C 21/3484 |
| 2018/0178808 A1 | 6/2018 | Zhao et al. | |
| 2018/0370461 A1* | 12/2018 | Solar | A61M 21/00 |
| 2019/0047498 A1* | 2/2019 | Alcaidinho | A61M 21/00 |
| 2019/0061655 A1* | 2/2019 | Son | B60R 1/00 |
| 2019/0133511 A1* | 5/2019 | Migneco | A61B 5/02055 |
| 2020/0114929 A1* | 4/2020 | Wan | A61B 5/7275 |
| 2020/0406899 A1* | 12/2020 | Alvarez Troncoso | G08G 1/096708 |
| 2021/0221404 A1* | 7/2021 | Reiner | B60W 60/0051 |
| 2022/0001894 A1* | 1/2022 | Yeom | B60W 60/0013 |

* cited by examiner

*Primary Examiner* — Jeff A Burke
*Assistant Examiner* — Kyle T Johnson
(74) *Attorney, Agent, or Firm* — Brandon Hicks; Eversheds Sutherland (US) LLP

(57) ABSTRACT

Systems and methods for avoiding or mitigating motion sickness in a vehicle are disclosed herein. The systems and methods may include (a) determining a profile of the individual inclination towards motion sickness; (b) predicting an individual effectiveness of countermeasures based on typing using the data from step (a); (c) evaluating the actual effectiveness of the predicted countermeasures after their implementation when travelling in the vehicle; wherein step (a) is repeated regularly and all data and results from step (c) are fed into a self-learning system in order to obtain an improved statement on the individual actual effectiveness of countermeasures taken and to make the selection of effective countermeasures based on them.

8 Claims, 2 Drawing Sheets

METHODS AND SYSTEMS FOR CONTROLLING MOTOR VEHICLE FUNCTIONS FOR CONTROLLING MOTION SICKNESS

CROSS-REFERENCE TO RELATED APPLICATIONS

The present disclosure claims priority to and the benefit of DE Application No. 102020201218.0, filed Jan. 31, 2020, which is hereby incorporated by reference herein in its entirety.

BACKGROUND

Many people suffer from motion sickness while driving in a vehicle. Uneven or hilly roads, potholes, curves, stopping and starting, etc., for example, can cause some people to suffer from motion sickness. Furthermore, motion sickness can be caused and/or aggravated by other factors for a vehicle occupant. Reading a book, watching a video and excessively hot weather, etc., can, for example, cause or amplify feelings of dizziness, nausea, etc. Attempts to relieve motion sickness can involve taking medication, not using media, such as books or video, concentrating on a point in the distance through a window, etc.

Studies have shown that around 45% of passengers in a vehicle have suffered motion sickness in the last 5 years, whereas the drivers themselves almost never become ill with travel due to the control of the vehicle and the good view ahead.

It is therefore assumed that with the increase in autonomous vehicles, there will also be an increase in motion sickness. However, it has also been found that there are greater personal differences in inclination and vulnerability, including in terms of the effectiveness of countermeasures.

A method is known from DE 10 2014 221 337 A1 for collecting data relating to a movement of the vehicle and determining from the collected data whether a limit has been exceeded from which motion sickness occurs. As a result, at least one component of the vehicle can be modified in its functioning.

A method is known from DE 10 2015 011 708 A1 for reducing kinetosis-related disturbances of an occupant in a vehicle. An individual inclination of the occupant to kinetosis is recorded by means of a manual input, wherein at least vehicle parameters, health parameters of the occupant and/or parameters relating to the route are recorded for the determination of an occurrence of kinetosis-related disturbances and on the basis of which at least a discomfort threshold is determined, wherein at least one warning message regarding the occurrence of an impending kinetosis-related disturbance is automatically issued before reaching the at least one discomfort threshold.

DE 10 2016 204 635 A1 describes a method for avoiding or mitigating motion sickness in a vehicle, wherein the vehicle has an automated driving mode in which the vehicle moves at least partially automatically, the method having the following steps: a) estimating at least one characteristic parameter of the occurrence of motion sickness in an occupant of the vehicle; (b) determining, on the basis of this parameter, at least one appropriate measure for mitigating or preventing motion sickness in the occupant of the vehicle; and (c) transmitting information to the driver concerning this at least one measure.

On the other hand, there is still a need for an individualized method for preventing motion sickness.

SUMMARY

According to the disclosure, it has been established that if a method for avoiding or mitigating motion sickness in a vehicle includes the following steps: (a) determining a profile of the individual inclination towards motion sickness; (b) predicting the individual effectiveness of countermeasures based on typing using the data from step (a); (c) evaluating the actual effectiveness of the predicted countermeasures after their implementation when travelling in the vehicle; where step (a) is repeated regularly and all data and results from step (c) are fed into a self-learning system in order to obtain an improved statement on the individual actual effectiveness of countermeasures taken and to make the selection of effective countermeasures based on them; it is possible to make improved recommendations for the individual passenger to prevent or reduce motion sickness in the vehicle.

In other words, the individual tendency to suffer motion sickness under certain conditions is not only recorded once, but repeatedly, on a computer system and a prediction is made for the individual effectiveness of certain countermeasures based on typing. The individual inclination is not only recorded manually once but is recorded on the basis of a number of methods and the system learns on the basis of previous journeys what the actual sensitivity of the occupant to certain conditions is. Thus, it is a continuously learning system, which is preferably implemented by means of modern artificial intelligence methods implemented on a computer comprising a processor and memory.

Preferably, data and results from other passengers are also fed into the self-learning system. Thus, a kind of swarm intelligence can be used to weight particularly helpful countermeasures more strongly.

Habituation effects can also be taken into account. In other words, habituation/adaptation effects are taken into account and an individual "learning status" is determined. I.e. there is assisted "learning" of motion sickness or a gradual habituation.

In addition, further vehicle settings can also be fed into the self-learning system for consideration in the analysis, so that a balance with other objectives or requirements other than motion sickness prevention itself is made (for example thermal comfort, cruising speed).

In addition, settings that are not necessarily related to motion sickness (for example display design, light color, odor, etc.) can also be taken into account in order to achieve a consideration of previous experience of motion sickness to certain environmental stimuli (for example car odor) and to decouple them or not adjust them accordingly.

The determination of the individual tendency to motion sickness as a passenger in a vehicle, in particular a passenger car, can be determined in different ways. This information can then be used to create a profile of sensitivity to motion sickness that is specific to the individual. The profile can be saved on a computer system of the vehicle, a mobile device, and/or on a server over the cloud.

Thus one example is the use of a standardized questionnaire, in which previous experiences and benefits are queried. By means of such a standardized validated instrument, the probability of the occurrence of motion sickness can always be quantitatively estimated depending on the specific situation. Other such instruments include psychometric testing methods, psychological queries, obstructive circumstances or even investigations such as the rod and frame test as a psychophysical method for testing the perception or sensitivity to it.

Of course, the previous experiences and subjective assessments after the end of travel in the respective vehicle, which can be maintained, for example, by means of apps on smartphones, are particularly important in this context.

In addition, it is possible to monitor physiological parameters (such as body temperature by means of infrared cameras, heart rate, respiratory rate, conductivity of the skin or sweat production) and to relate them to the occurrence of motion sickness.

These composite individual data then result in an individualized profile stored at the vehicle, on a smart phone, and/or on a server over the cloud that can be used to accurately predict the best possible countermeasures for the respective passenger.

Also, based on the profile thus generated, instructions can be generated directly from the system, for example, not to read or to control the vehicle in a correspondingly automatic or guided manner. For example, the damper hardness could be set automatically, or a head-up display could be displayed to indicate an artificial horizon to reduce motion sickness.

Since the effectiveness of the countermeasures is regularly queried and the results are fed into the self-learning system, the countermeasures are constantly optimized.

The respective personal profile can be stored or carried, for example, in the vehicle, in a key, in a smartphone, in the cloud, or in any other way.

BRIEF DESCRIPTION OF THE DRAWINGS

Further details of the disclosure can be found in the following description of embodiments based on the drawing, in which.

DETAILED DESCRIPTION

Figure 1:
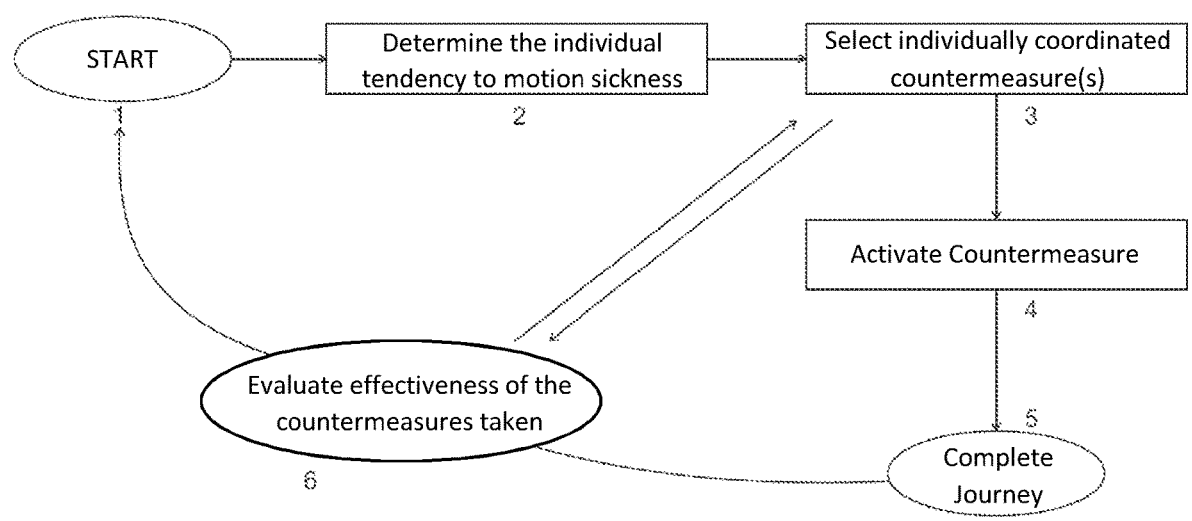
FIG. 1 shows a schematic organization chart of the essential steps of the method and FIG. 2 shows detailing of individual steps from FIG. 1.

FIG. 1 shows a generic organization chart of the essential steps of the method. After the start in step 1, a determination of the individual tendency to motion sickness is carried out in the following step 2.

Based on this, a selection of individually coordinated countermeasures is made in step 3, wherein these countermeasures are activated in step 4.

After completion of the journey in step 5, an evaluation is carried out in step 6 of the effectiveness of the countermeasures taken or predicted, in order to take them into account—depending on the effectiveness—in the next trip when selecting the proposed countermeasures.

Figure 2:
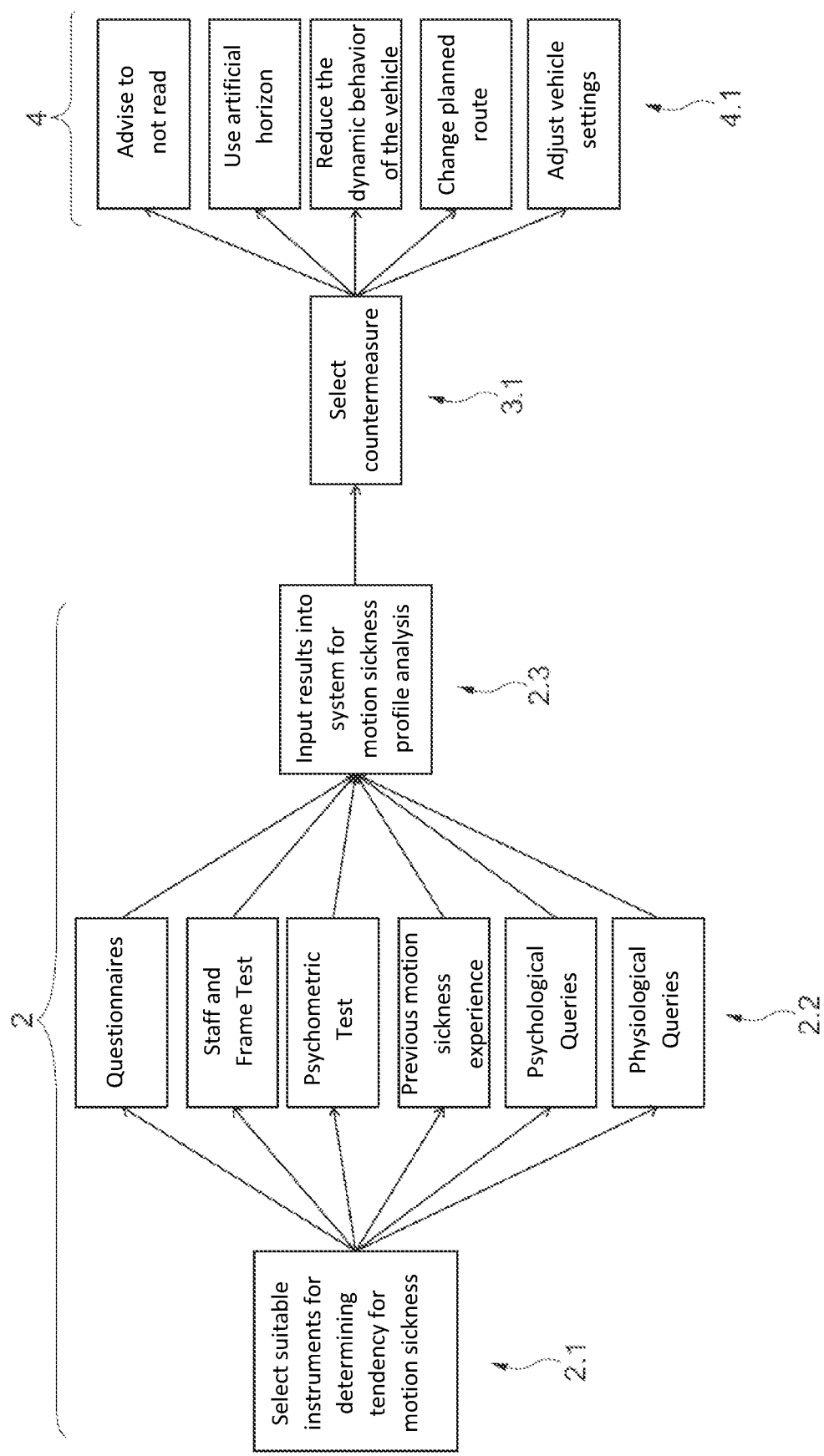

The determination of the individual tendency to motion sickness in step 2 can be divided substantially based on 3 subunits, as shown in FIG. 2.

Thus, in step 2.1 suitable instruments are selected for determining the tendency to motion sickness, in step 2.2 these suitable instruments, which include questionnaires, staff and frame test, psychometric test procedures, previous motion sickness experiences, psychological and physiological queries as well as other vehicle settings, are implemented and in step 2.3 their results are fed into a system for motion sickness profile analysis, which produces data by means of artificial intelligence for use of a countermeasure selection unit 3.1.

The countermeasure selection unit 3.1 world accordingly propose the countermeasures and activates the proposed selection 4.1 (where possible) in step 4.

Measures 4.1 include the advice to the passenger not to read, the use of a head-up display to create an artificial horizon, the reduction or control of the dynamic behavior of the vehicle, a change of the planned route to a gentler more comfortable route and, where appropriate, the adjustment of other vehicle settings such as temperature, odor and lighting.

As indicated in FIG. 1 in step 6, after the end of the corresponding journey on the basis of the subjective evaluation of the passenger, feedback is provided to the countermeasure selector unit 3.1 on the effectiveness or results of the countermeasures used on the basis of the previous selection, so that on the basis of this continuous optimization for the respective individual can be made.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

The invention claimed is:

1. A method for avoiding or mitigating motion sickness in a vehicle, comprising:
   (a) determining a profile of individual inclination towards motion sickness for a passenger of the vehicle, wherein the profile of individual inclination towards motion sickness comprises one or more conditions having a tendency to cause the passenger of the vehicle to experience motion sickness;
   (b) predicting individual effectiveness of countermeasures against the one or more conditions based on typing using the profile of step (a), wherein the countermeasures comprise automatically setting a damper hardness of the vehicle;
   (c) evaluating actual effectiveness of the predicted countermeasures after their implementation when travelling in the vehicle;
   where step (a) is repeated and all data and results from step (c) are fed into a self-learning system in order to obtain an improved statement on the actual effectiveness of countermeasures taken and to carry out a selection of effective countermeasures based on them, wherein each countermeasure is given a weight based on the actual effectiveness of the countermeasure; and
   where steps (a)-(c) are repeated for other passengers of the vehicle, wherein the weight assigned to the countermeasure is further increased if the countermeasure is also taken against the one or more conditions shared by the other passengers of the vehicle.

2. The method according to claim 1, wherein data and results of other passengers are also fed into the self-learning system.

3. The method according to claim 1, wherein habituation effects are taken into account.

4. The method according to claim 1, wherein further vehicle settings are also fed into the self-learning system for consideration during the analysis.

5. A system for avoiding or mitigating motion sickness in a vehicle, comprising:
- a processor and memory, wherein the processor is configured to:
- (a) determine a profile of individual inclination towards motion sickness for a passenger of the vehicle, wherein the profile of individual inclination towards motion sickness comprises one or more conditions having a tendency to cause the passenger of the vehicle to experience motion sickness;
- (b) predicting individual effectiveness of countermeasures against the one or more conditions based on typing using the profile of step (a), wherein the countermeasures comprise automatically setting a damper hardness of the vehicle;
- (c) evaluate actual effectiveness of the predicted countermeasures after their implementation when travelling in the vehicle;
- where step (a) is repeated and all data and results from step (c) are fed into a self-learning system in order to obtain an improved statement on the actual effectiveness of countermeasures taken and to carry out a selection of effective countermeasures based on them, wherein each countermeasure is given a weight based on the actual effectiveness of the countermeasure; and
- where steps (a)-(c) are repeated for other passengers of the vehicle, wherein the weight assigned to the countermeasure is further increased if the countermeasure is also one taken against the one or more conditions shared by the other passengers of the vehicle.

6. The system according to claim 5, wherein data and results of other passengers are also fed into the self-learning system.

7. The system according to claim 5, wherein habituation effects are taken into account.

8. The system according to claim 5, wherein further vehicle settings are also fed into the self-learning system for consideration during the analysis.

* * * * *